United States Patent
Hasegawa

(10) Patent No.: US 8,098,410 B2
(45) Date of Patent: Jan. 17, 2012

(54) IMAGE READING APPARATUS, IMAGE FORMING APPARATUS, IMAGE READING METHOD, AND IMAGE FORMING METHOD

(75) Inventor: Ryu Hasegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 404 days.

(21) Appl. No.: 12/403,927

(22) Filed: Mar. 13, 2009

(65) Prior Publication Data

US 2009/0237745 A1    Sep. 24, 2009

(30) Foreign Application Priority Data

Mar. 18, 2008    (JP) .................................. 2008-069283

(51) Int. Cl.
*H04N 1/04* (2006.01)
(52) U.S. Cl. ........ 358/461; 358/475; 358/465; 358/496; 358/498; 358/406
(58) Field of Classification Search .................. 358/461, 358/475, 465, 496, 498, 406; 382/274; 399/51, 399/52, 205
See application file for complete search history.

(56) References Cited

U.S. PATENT DOCUMENTS

| | | | | |
|---|---|---|---|---|
| 5,771,106 A | * | 6/1998 | Taguchi et al. | 358/461 |
| 2009/0201519 A1 | * | 8/2009 | Hasegawa | 358/1.9 |

FOREIGN PATENT DOCUMENTS

| | | |
|---|---|---|
| JP | 2002-300394 | 10/2002 |
| JP | 2005-167854 | 6/2005 |

* cited by examiner

*Primary Examiner* — Cheukfan Lee
(74) *Attorney, Agent, or Firm* — Dickstein Shapiro LLP

(57) ABSTRACT

During a sheet-through operation, for a first original, a shading operation is performed to acquire white data and a light-quantity measuring operation is performed to acquire a reference value. For subsequent originals, only the light-quantity measuring operation is performed to acquire a subsequent light quantity. If the reference value and the subsequent light quantity differ greatly, the shading operation is performed at this time point to acquire new white data. The sheet-through operation is not stopped when the shading operation is not performed and the sheet-through operation is stopped when the shading operation is performed.

16 Claims, 8 Drawing Sheets

IMAGE READING APPARATUS, IMAGE FORMING APPARATUS, IMAGE READING METHOD, AND IMAGE FORMING METHOD

CROSS-REFERENCE TO RELATED APPLICATIONS

The present application claims priority to and incorporates by reference the entire contents of Japanese priority document 2008-069283 filed in Japan on Mar. 18, 2008.

BACKGROUND OF THE INVENTION

1. Field of the Invention

The present invention relates to an image reading apparatus.

2. Description of the Related Art

Conventional image reading apparatuses have been disclosed in, for example, Japanese Patent Application Laid-open Nos. 2005-167854 and 2002-300394.

Japanese Patent Application Laid-open No. 2005-167854 discloses a technique for improving productivity of image reading of an original by performing shading correction most efficiently and correctly depending on situation and by reducing a reading interval between originals without deteriorating the quality of a read image. Specifically, if a time Td between originals, required for performing a sheet-through operation without stopping, is longer than a shading operating time Ts of a document feeder (DF), successive reading is performed in a nonstop operation. When a memory permission notification is notified from a controller after the sheet-through operation is decelerated, the sheet-through operation is performed after the memory permission notification is received. When size reduction of an original is specified in reading the original, the DF is caused to start the sheet-through operation when a time T (=Tds−Td) has passed after the memory permission request is received from the controller, where Tds is a time from receiving of the memory permission notification to finishing of the shading correction by the DF.

Japanese Patent Application Laid-open No. 2002-300394 teaches a shading correction function facilitating high-speed reading and minimizing degradation of scan per minute (SPM) to the utmost. Specifically, when a sheet-through automatic document feeder successively feeds originals one by one, a shading operation and a light-quantity measuring operation is performed with respect to the first original. The shading operation includes stopping the sheet-through operation, scanning a white plate by using a scanner unit to acquire white data. Shading correction data is generated from the white data and the shading correction data is used to perform shading correction of image data acquired from the originals. The light-quantity measuring operation includes measuring the light quantity of an exposure lamp that illuminates originals with the scanner unit. The light quantity data of the exposure lamp measured in the light-quantity measuring operation corresponding to the first original is saved as a reference value.

Even when the setting is such that the shading operation is not to be performed with respect to the second and subsequent originals, the light-quantity measuring operation is still performed with respect to each subsequent original (i.e., the second original to the last original) thereby acquiring subsequent light quantity data. If the difference between the reference data and the subsequent light quantity data is out of a preset range, it means that the conditions have changed whereby the reference value is no more appropriate. In this situation, the reference value is updated with the latest subsequent light quantity data.

FIG. 7 is a flowchart of the process of intermittent shading correction performed by the image reading apparatus disclosed in Japanese Patent Application Laid-open No. 2002-300394. The scanner unit performs a density measuring operation in an interval between sheets of paper (Step S101). The density measuring operation includes measuring a density of a member that is provided on the original feeding side. "Interval between sheets of paper" in this specification means a period between a time point at which the trailing edge of a preceding original leaves a scanning position and a time point at which the leading edge of a subsequent original reaches the scanning position. In other words, in the density measuring operation the scanner unit measures the density of the member after the trailing edge of the first original has passed a scanning position and before a leading edge of the second original reaches the scanning position. If the preceding original is the first original, then the measured density is saved as a reference value (Steps S102 and S103).

If the preceding original is an original other than the first original (Step S102), an amount of change is calculated based on the reference value and the density measured at Step S101 (Step S104). The amount of change is expressed in percent. An allowable range of the amount of change is previously determined. It is determined whether the calculated amount of change is within the allowable range (Step S105). If the calculated amount of change is within the allowable range, the process is terminated (YES at Step S105). On the other hand, if the calculated amount of change is out of the allowable range (NO at Step S105), it means that the current reference value is no more appropriate for the current conditions. In this situation, the reference value is updated (Step S106).

When updating the reference value, first, an instruction to stop the sheet-though operation is output (Step S107), so that feeding of originals is stopped. In this situation, the shading operation is performed to acquire new white data (Step S108). Upon completion of the shading operation (Step S109), the existing white data is corrected, or updated, with the new white data. Finally, an instruction to start the sheet-though operation is output (Step S110) so that feeding of originals is started, and the process is terminated. Thereafter, Steps S101 to S110 are repeated for all the originals to be read.

Japanese Patent Application Laid-open No. 2002-300394 proposes an image reading apparatus that includes an automatic document feeding mechanism capable of enhancing productivity by not executing the shading operation for each original, but by reducing intervals of the shading operation to thereby reduce a waiting time for the shading operation. It is suggested that the productivity can be enhanced by optimizing an interval between originals using arbitrary means based on whether or not the shading operation is to be executed. Specifically, as understood from the flowchart in FIG. 7, sheet-through operation (original feeding) is explicitly stopped (Step S107) before beginning the shading operation, and the sheet-through operation is restarted after the shading operation is completed (Step S110). Meanwhile, when the shading operation is not to be executed (YES at Step S105), i.e., when the calculated amount of change is within the allowable range, the timing of starting the sheet-through operation is not certain. Various drawbacks occur if this timing is not correct. Therefore, the sheet-through operation cannot always be performed in a nonstop manner, and the productivity cannot thereby be maximally improved.

Specifically, as shown in a timing chart in FIG. 8, if the sheet-through operation is to be performed in a non-stop manner, the start of sheet-through operation needs to be triggered before a sheet-through deceleration period L1 starts. Otherwise, the sheet-through operation cannot be started at a timing T1 at which a sheet-through stop period L2 is over. However, Japanese Patent Application Laid-open No. 2002-300394 does not disclose about when and how to start the sheet-through operation when the shading operation is not to be executed, i.e., when the calculated amount of change is within the allowable range.

Meanwhile, Japanese Patent Application Laid-open No. 2005-167854 proposes an image reading apparatus capable of enhancing productivity by comparing a time interval between originals when the originals are fed nonstop using the automatic document feeder with a time required for the shading operation, and of feeding the originals nonstop when the shading time is shorter than the other. Therefore, because the shading time becomes substantially zero when the shading operation is not executed in the technology disclosed in Japanese Patent Application Laid-open No. 2002-300394, a nonstop operation determination mechanism described in Japanese Patent Application Laid-open Nos. 2005-167854 is used to feed the originals nonstop, which can achieve improvement of the productivity.

However, in the document feeder, when the trigger of the start of sheet-through operation is received before the sheet-through operation is decelerated, the sheet-through operation is performed nonstop, and when the trigger is received after the sheet-through operation is decelerated, the operation is performed with deceleration of the sheet-through operation and stop of the sheet-through operation. Therefore, to switch between operations so that the nonstop sheet-through operation is performed when the shading operation is not executed and the stop operation is performed when it is executed, it is necessary to provide a mechanism to explicitly switch to the sheet-through operation.

SUMMARY OF THE INVENTION

It is an object of the present invention to at least partially solve the problems in the conventional technology.

According to an aspect of the present invention, there is provided an image reading apparatus including a scanner unit configured to scan an original and acquire image data; an original tray for stacking a pile of originals; a feeding control unit that controls feeding of originals from the original tray to a scanning position, the control of feeding of original including a sheet-through operation in which originals are fed continuously one by one from the original tray to a scanning position; a scanning control unit that causes the scanner unit to be fixed at the scanning position so as to scan originals that pass over the scanning position when the originals are fed from the original tray, and a white plate provided in a position different from the scanning position; a shading operation unit that performs a shading operation, the shading operation including moving the scanner unit to the position of the white plate, and scanning the white plate to acquire white data to be used in performing shading correction on image data acquired by the scanner unit; and a measuring unit that performs a light-quantity measuring operation, the light-quantity measuring operation including causing the scanner unit to measure a light quantity of an exposure lamp that illuminates the original at the scanning position. When a pile of originals is placed on the original tray, the feeding control unit performs the sheet-through operation, when one original is fed from the original tray to the scanning position, the shading operation unit performs the shading operation to acquire current white data, the measuring unit performs the light-quantity measuring operation to acquire current light quantity of the exposure lamp as a reference value, when a subsequent original is fed from the original tray to the scanning position, the measuring unit performs the light-quantity measuring operation to acquire current light quantity of the exposure lamp as a subsequent light quantity. When an amount of change between the reference value and the subsequent light quantity is out of a predetermined range, the shading operation unit performs the shading operation to acquire new white data and updates existing white data with the new white data, the measuring unit performs the light-quantity measuring operation to acquire new light quantity and updates existing light quantity with the new light quantity, and the feeding control unit does not stop the sheet-through operation when the shading operation unit is not to perform the shading operation, and the feeding control unit stops the sheet-through operation when the shading operation unit is to perform the shading operation.

According to another aspect of the present invention, there is provided an image forming apparatus that includes the above image reading apparatus.

According to still another aspect of the present invention, there is provided an image reading method enforced on an image reading apparatus. The image reading apparatus including a scanner unit configured to scan an original and acquire image data; an original tray for stacking a pile of originals; a feeding control unit that controls feeding of originals from the original tray to a scanning position, the control of feeding of original including a sheet-through operation in which originals are fed continuously one by one from the original tray to a scanning position; a scanning control unit that causes the scanner unit to be fixed at the scanning position so as to scan originals that pass over the scanning position when the originals are fed from the original tray; a white plate provided in a position different from the scanning position; a shading operation unit that performs a shading operation, the shading operation including moving the scanner unit to the position of the white plate, and scanning the white plate to acquire white data to be used in performing shading correction on image data acquired by the scanner unit; and a measuring unit that performs a light-quantity measuring operation, the light-quantity measuring operation including causing the scanner unit to measure a light quantity of an exposure lamp that illuminates the original at the scanning position. The image reading method including, when a pile of originals is placed on the original tray, the feeding control unit performing the sheet-through operation, when one original is fed from the original tray to the scanning position, the shading operation unit performing the shading operation to acquire current white data, the measuring unit performing the light-quantity measuring operation to acquire current light quantity of the exposure lamp as a reference value, when a subsequent original is fed from the original tray to the scanning position, the measuring unit performing the light-quantity measuring operation to acquire current light quantity of the exposure lamp as a subsequent light quantity, and when an amount of change between the reference value and the subsequent light quantity is out of a predetermined range, the shading operation unit performing the shading operation to acquire new white data and updates existing white data with the new white data, the measuring unit performing the light-quantity measuring operation to acquire new light quantity and updates existing light quantity with the new light quantity, and the feeding control unit not stopping the sheet-through operation when the shading operation unit is not to perform the shading operation, and the feeding control unit stopping the sheet-through operation when the shading operation unit is to perform the shading operation.

According to still another aspect of the present invention, there is provided an image forming method including the image reading method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
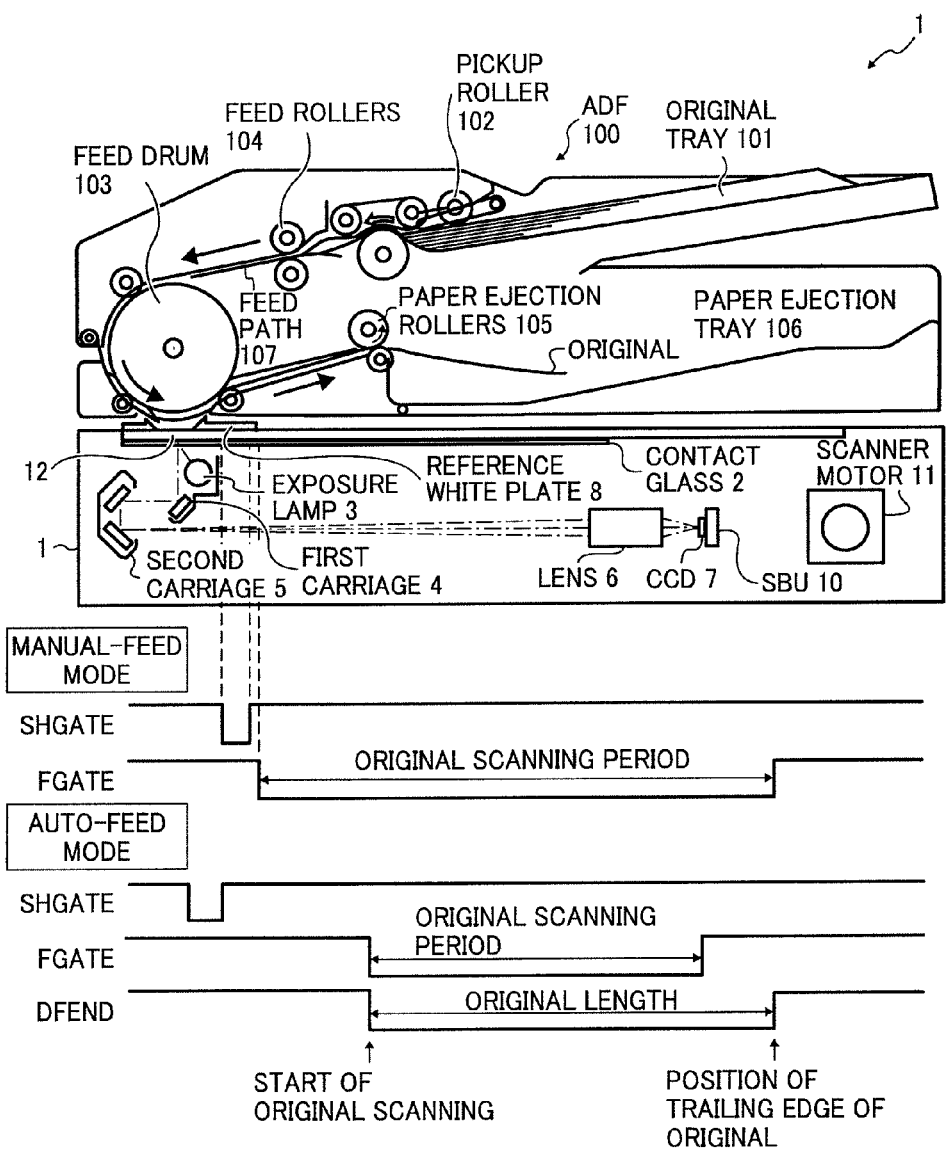
FIG. 1 is a schematic diagram of a configuration of an image reading apparatus and a time chart of a scanning operation according to an embodiment of the present invention.
Figure 2:
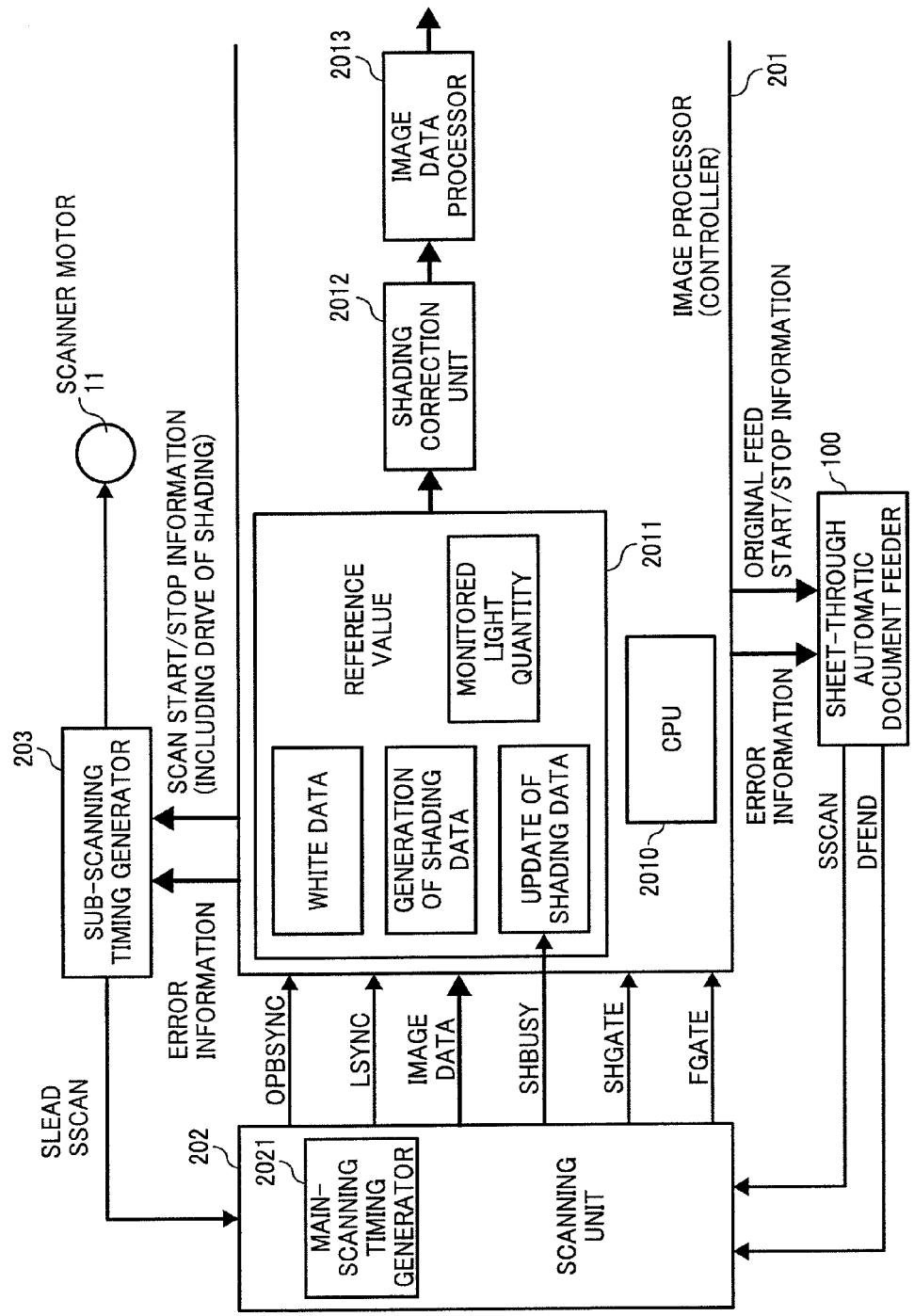
FIG. 2 is a functional block diagram of a control system of the image reading apparatus for explaining flow of signals.

FIG. 1 is a schematic diagram of an image reading apparatus 1 and a time chart of a scanning operation according to an embodiment of the present invention. Two modes of original feeding are possible in the image reading apparatus 1: one is manual-feed mode in which an original is manually placed on a contact glass and the other is auto-feed mode in which an original is set in an automatic document feeder. FIG. 2 is a functional block diagram of a control system of the image reading apparatus 1.

A hardware configuration of the image reading apparatus 1 is almost the same as that of a typical image reading apparatus. Namely, in the manual-feed mode, the original set on a contact glass 2 is irradiated with a light beam from an exposure lamp 3 provided in a first carriage 4. The light reflected from the surface of the original is then reflected from mirrors provided in a second carriage 5 and converged with lens 6 and focused onto a CCD 7. The first carriage 4 and the second carriage 5 are moved so as to scan the surface of the original thereby "reading" the original and acquiring image data of the original. The exposure lamp 3 can be fluorescent lamp. The CCD 7 is mounted on a scanner board unit (SBU). The CCD 7 can be some other image sensor. The first carriage 4 and the second carriage 5 are driven by a scanner motor 11.

The image data is typically subjected to shading correction in order to improve the image quality. The shading correction is performed based on the shading data acquired by assuming white as a reference color. For this purpose, a white plate 8 is provided in the image reading apparatus 1. The first carriage 4 and the second carriage 5 are moved so as to scan the white plate 8 and acquire white data.

When beginning the operation of reading the original placed on the contact glass 2, the exposure lamp 3 is turned on, and the first and the second carriages 4 and 5 are moved at a preset constant speed, and first the white plate 8 is read and white data is collected while an SHGATE signal is active. After reading of the white plate 8 is completed, the first carriage 4 is moved to a scanning position 12 of the original and the original is read while an FGATE signal is active while moving the first and the second carriages 4 and 5 at a preset constant speed. After the entire original is read, the first and the second carriages 4 and 5 are returned to their initial positions.

The scanning position 12 is provided in the upstream side of the white plate 8. Specifically, as illustrated in FIG. 1, the scanning position 12 is provided on the left side of the white plate 8.

A sheet-through automatic document feeder (hereinafter, "ADF") 100 includes the original tray 101, a pickup roller 102, the feed drum 103, a pair of feed rollers 104, a pair of paper ejection rollers 105, and a paper ejection tray 106. The ADF 100 is fixed to the top surface of an image reading apparatus 1 in an openable/closable manner. Set on the original tray 101 is a stack of originals that are to be scanned. When the sheet-through operation is started, the originals are picked up one by one from the top thereof by the pickup roller 102 and are sent to the feed drum 103. The originals are sent to the scanning position 12 along a feed path 107 while being held between the feed rollers 104 and sandwiched between the feed rollers 104 and the feed drum 103, scanned when they reach the scanning position 12, and ejected by the paper ejection rollers 105 onto the paper ejection tray 106.

As shown in FIG. 2, the image reading apparatus 1 functionally includes an image processor 201, a scanning unit 202, and a sub-scanning timing generator 203. The image processor 201 includes a CPU 2010, a shading data generating/updating unit 2011, a shading correction unit 2012, and an image data processor 2013. The scanning unit 202 includes a main-scanning timing generator 2021.

The scanning operation in the manual-feed mode is briefly explained below. In the manual-feed mode, an original is placed on the contact glass 2. In the following explanation, "to assert" means rising of a signal which means a start of a process, and "to negate" means returning of the signal to its former state which means an end of the process. "White data is normal" means that, when a white side of 8-bit image data is assumed to be 255 and a black side thereof is assumed to be 0, the white data is close to 255.

When receiving "scan start information", the sub-scanning timing generator 203 resets an abnormality flag, turns on the exposure lamp 3, and causes the scanner motor 11 to drive a scanner unit that includes the first and the second carriages 4 and 5. When the first carriage 4 reaches the position for scanning the white plate 8, an SLEAD signal is asserted. The scanner unit scans the white plate 8 while the SLEAD signal is asserted and acquires white data, and transmits the white data to the image processor 201. The image processor 201 calculates the shading data from the white data.

When the first carriage 4 leaves the area of the white plate 8 and reaches a position of negating the SLEAD signal, the SLEAD signal is negated, and the sub-scanning timing generator 203 loads the white data. If the value of the white data is close to the value of white, i.e., 255, the image scanning process is continued. When the first carriage 4 reaches a scanning position of the original that is placed on the contact glass 2, an SSCAN signal is asserted, and image scanning process is performed in a usual manner. If the value of the white data is not close to the value of white, i.e., 255, the SSCAN signal (FGATE signal) is not generated so as to prevent the process of scanning the original data. Thus, abnormal original data is not sent to the image processor 201, so that an output of the abnormal image can be prevented. The shading data generating/updating unit 2011 calculates new shading data from the white data and updates the existing shading data with the new shading data.

The scanning operation in the auto-feed mode is briefly explained below. In the auto-feed mode, an original is set on the original tray 101. In the state that the original is set on the original tray 101, and a scan start instruction is received, the shading operation is performed first. Specifically, the first carriage 4 moves to a position to scan the white plate 8, scans the white plate 8 and acquires white data, saves the white data, and returns to the scanning position 12 for the sheet-through operation. The shading data generating/updating unit 2011 calculates new shading data from the white data and updates the existing shading data with the new shading data. After the first carriage 4 returns to the scanning position 12, one original set on the original tray 101 is fed to the scanning position 12 and scanned to acquire image data. This original is then discharged into paper ejection tray 106 by the paper ejection rollers 105 and the next original is fed to the scanning position 12 from the original tray 101 and scanned to acquire image data. The image data is subjected to the shading correction by using the shading data.

Flow of the signals is shown in FIG. 2. The sub-scanning timing generator 203 receives the scan start information, drives the scanner motor 11, and outputs the SLEAD signal indicating an area of scanning the white plate 8 to the scanning unit 202. The scanning unit 202 receives the signal, acquires line-synchronization (LSYNC) of the signal with a signal corresponding to an actual white-plate scanning position, and outputs the signal as an SHGATE signal to the image processor 201. The scanner unit reads the density of the white plate 8 during a period in which the SHGATE signal asserted to generate white data. When the shading operation is finished, the scanner unit returns to the scanning position for the sheet-through operation.

Next, the ADF 100 receives "original feeding start" information, and starts feeding the originals set on the original tray 101 one by one. When an original reaches the scanning position 12, the ADF 100 outputs the SSCAN signal. The scanning unit 202 acquires line-synchronization with the SSCAN signal, and outputs the FGATE signal to the image processor 201. When the trailing edge of the original passes through the scanning position 12, a DFEND signal is negated. A *SHGT signal is generated when the trailing edge of the original passes through the scanning position 12, and a logical AND operation is executed between *SHGT and SHGT. By doing this, the scanning unit 202 can calculate when to start and finish the density measuring operation in an interval between sheets of paper. The density measuring operation includes measuring a density of a member that is provided on the original feeding side. The interval between sheets of paper means a period between a time point at which the trailing edge of a preceding original leaves the scanning position 12 and a time point at which the leading edge of a subsequent original reaches the scanning position 12. The member provided on the original feeding side can be a white-color feed drum or a white plate other than the white plate 8. A guide plate (not shown) used to bring an original into tight contact with a glass window at the scanning position 12 can be used as the member. Although the member provided on the original feeding side is scanned in the interval between sheets of paper, the reference value is not updated with the data acquired from this member. With this control, a signal is generated so as to be reset when the SLEAD signal is asserted and so as to be preset with the DFEND signal, and the reference value is updated based on the signal.

The shading correction is performed to correct the change in a scanning level due to changes in distribution characteristics and the light quantity in the main scanning direction of the exposure lamp, and dirt on the white plate, dirt on mirrors, and dirt on the contact glass in the scanning position 12. The purpose of performing the shading correction for each original is mainly to counter the change in light amount of the exposure lamp. Furthermore, there is individual difference in stability of the light amount after turn-on of the exposure lamp is started, or there is a difference depending on the light source, so that characteristic of the exposure lamp are not stable.

Figure 7:
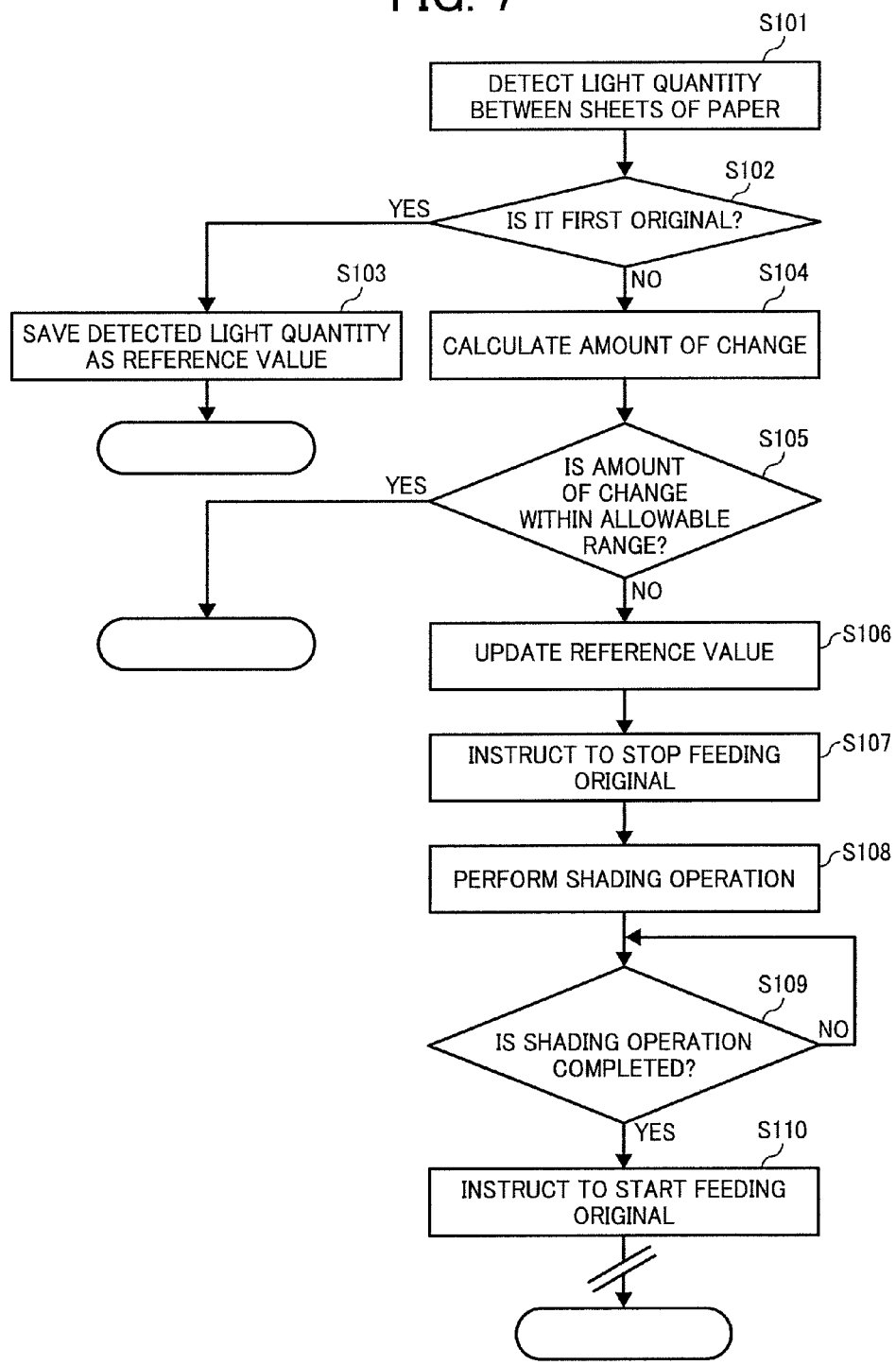
FIG. 7 is a flowchart of a control process executed by a conventional image reading apparatus.
Figure 8:
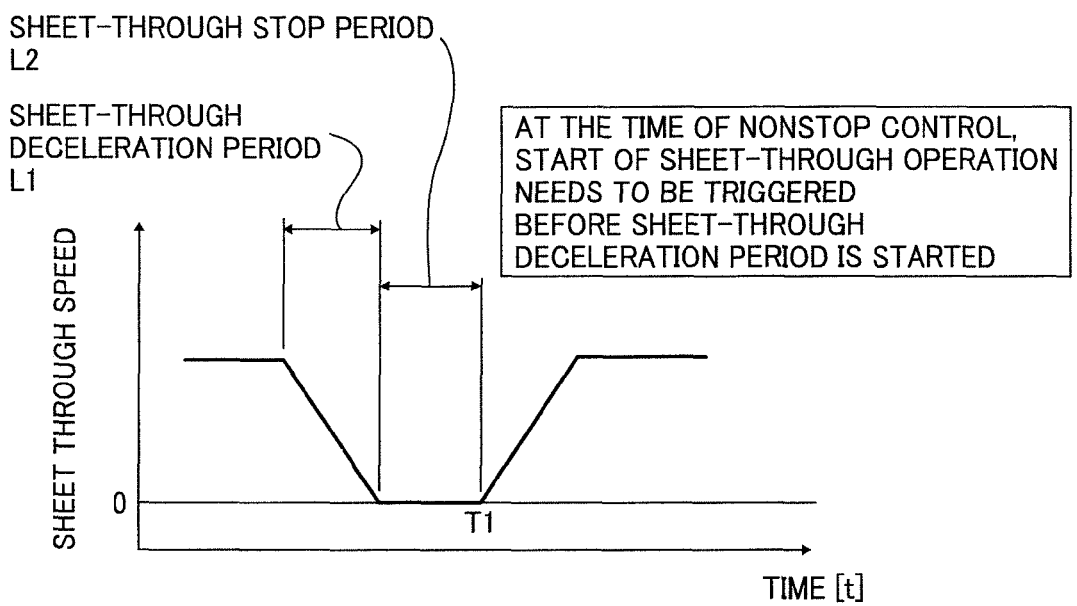
FIG. 8 is a timing chart representing a timing of a deceleration period when an original is fed and a timing of a stop period, which are executed based the conventional technology.

In the conventional technology, as shown in the flowchart of FIG. 7 and in the timing chart of FIG. 8, the reference value is acquired for the first original by performing the density measuring operation, and only the density of the member provided on the original feeding side is measured for the second and subsequent originals in the interval between sheets of paper. If the measured density and the reference value do not deviate greatly, i.e., if the amount of change between the measured density and the reference value is within an allowable range regarded as that the change will affect the quality of the images, the reference value is not updated. Meanwhile, if the amount of change is such that it will affect the quality of images, the shading operation is performed to measure new density and the reference value is updated with the new density.

Figure 3:
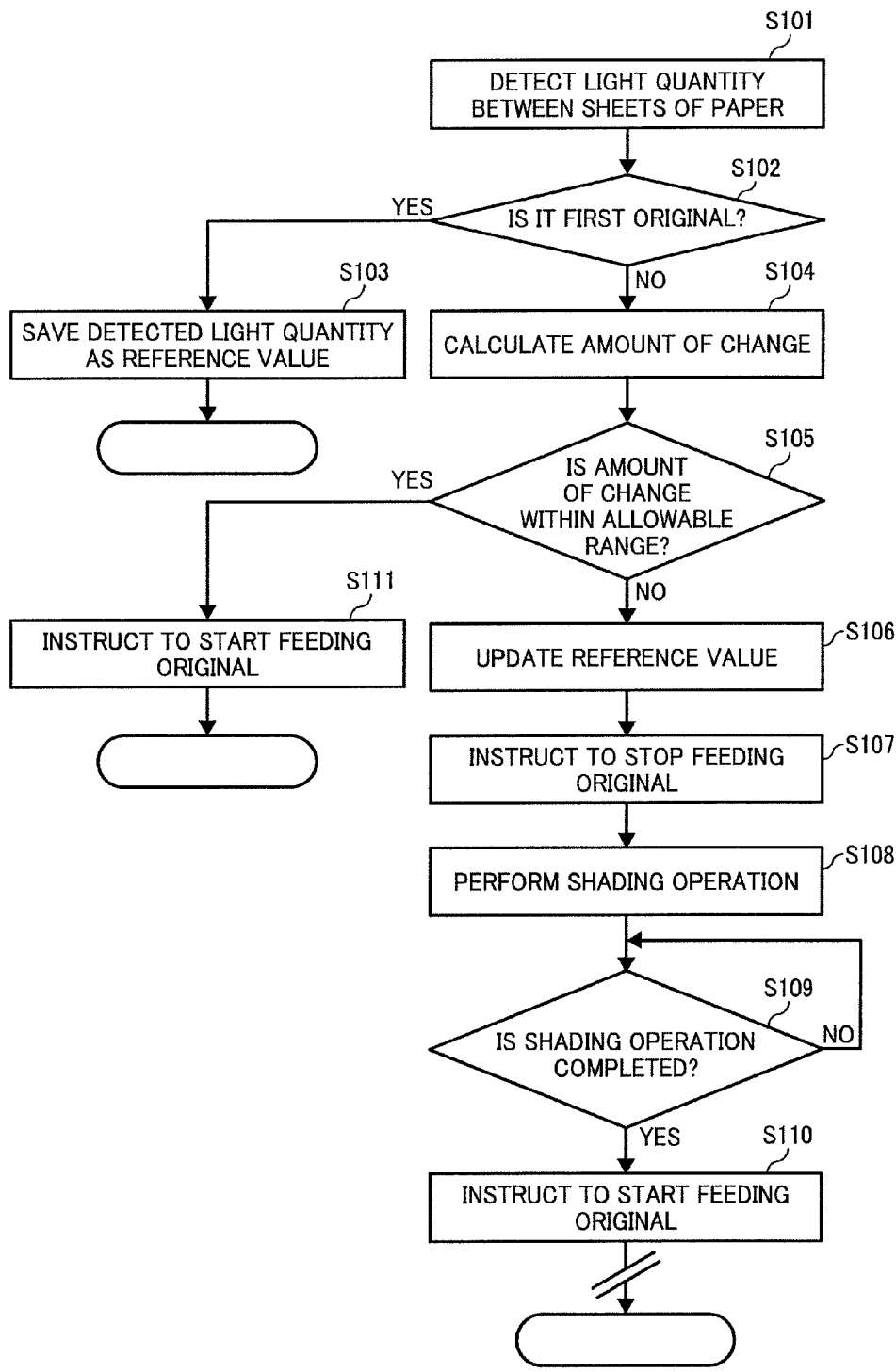
FIG. 3 is a flowchart of an example of a control process executed by the image reading apparatus.

On the other hand, in the embodiment, when the shading operation is not to be executed, i.e., when the amount of change is within the allowable range, the trigger of the start of sheet-through operation is given at the timing before the sheet-through operation is decelerated or before it is stopped, and this trigger causes the originals to be fed in a nonstop manner. The procedure at this time is shown in the flowchart of FIG. 3.

This flowchart is different from the flowchart shown in FIG. 7 according to the conventional technology in only one point. The difference is what happens at Step S105 when the amount of change is within the allowable range. Specifically, when the amount of change is within the allowable range (YES at step S105) an instruction to start original feeding operation is output (Step S111) at a timing that is before the sheet-through deceleration period L1 shown in FIG. 8 starts. The scanner unit performs a density measuring operation in an interval between sheets of paper (Step S101). The density measuring operation includes measuring a density of a member that is provided on the original feeding side. If the preceding original is the first original, then the measured density is saved as a reference value (Steps S102 and S103). If the preceding original is an original other than the first original (Step S102), an amount of change is calculated based on the reference value and the density measured at Step S101 (Step S104). The amount of change is expressed in percent. An allowable range of the amount of change that will not affect the image quality is previously determined. It is determined whether the calculated amount of change is within the allowable range (Step S105). If the amount of change is within the allowable range (YES at Step S105), an instruction to start original feeding operation is output and the process is terminated (Step S111). On the other hand, if the calculated amount of change is out of the allowable range (NO at Step S105), it means that the current reference value is no more appropriate for the current conditions. In this situation, the reference value is updated (Step S106).

When updating the reference value, first, an instruction to stop the sheet-though operation is output (Step S107), so that feeding of originals is stopped. In this situation, the shading operation is performed to acquire new white data (Step S108). Upon completion of the shading operation (Step S109), the existing white data is corrected, or updated, with the new white data. Finally, an instruction to start the sheet-though operation is output (Step S110) so that feeding of originals is started, and the process is terminated. Thereafter, Steps S101 to S110 are repeated for all the originals to be read. The shading data generating/updating unit 2011 calculates new shading data from the white data and updates the existing shading data with the new shading data.

Figure 4:
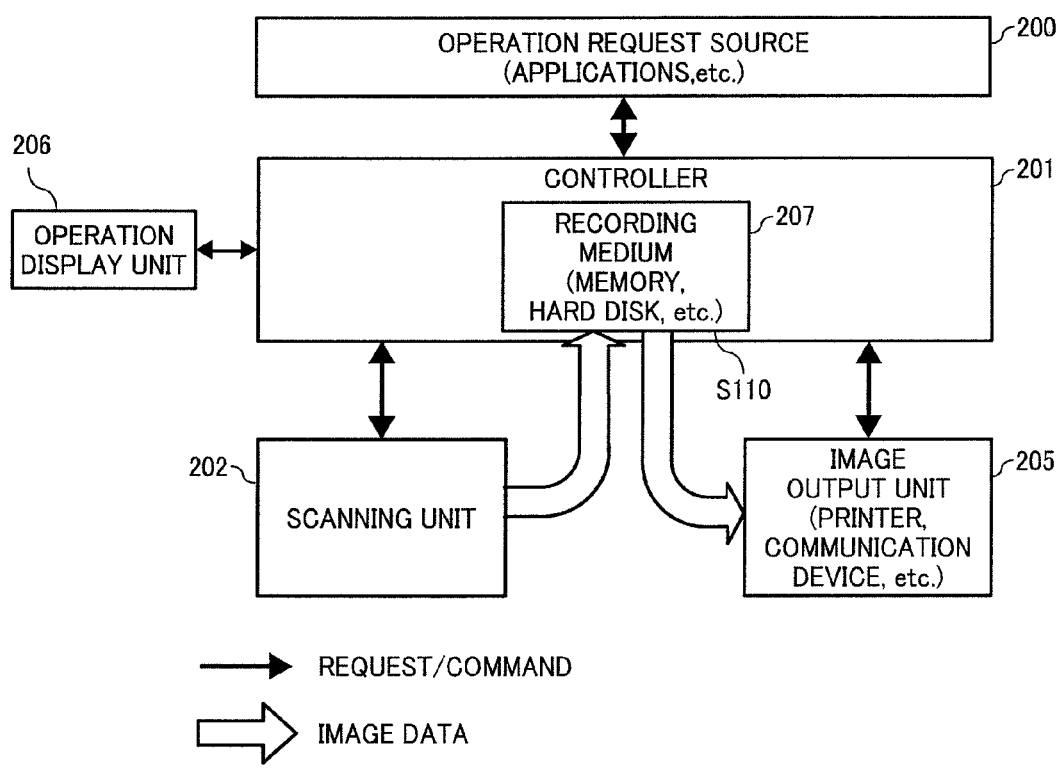
FIG. 4 is a block diagram of a conceptual system configuration of an image forming apparatus that includes the image reading apparatus.

In this case, with reference to FIG. 4, the timing when the trigger of the start of sheet-through operation can be given is immediately after the timing when the scanning unit 202 receives the memory permission notification from the image processor (controller) 201, or is arbitrary timing thereafter. FIG. 4 is a block diagram of a conceptual configuration of an image forming apparatus that includes the image reading apparatus 1. In FIG. 4, reference numeral 205 represents an image output unit, and 200 represents an operation request source (e.g., application).

By performing the process in the above manner, the sheet-through operation can be performed in a nonstop manner when the shading operation is not executed. This enables to improve scanning productivity.

Figure 5:
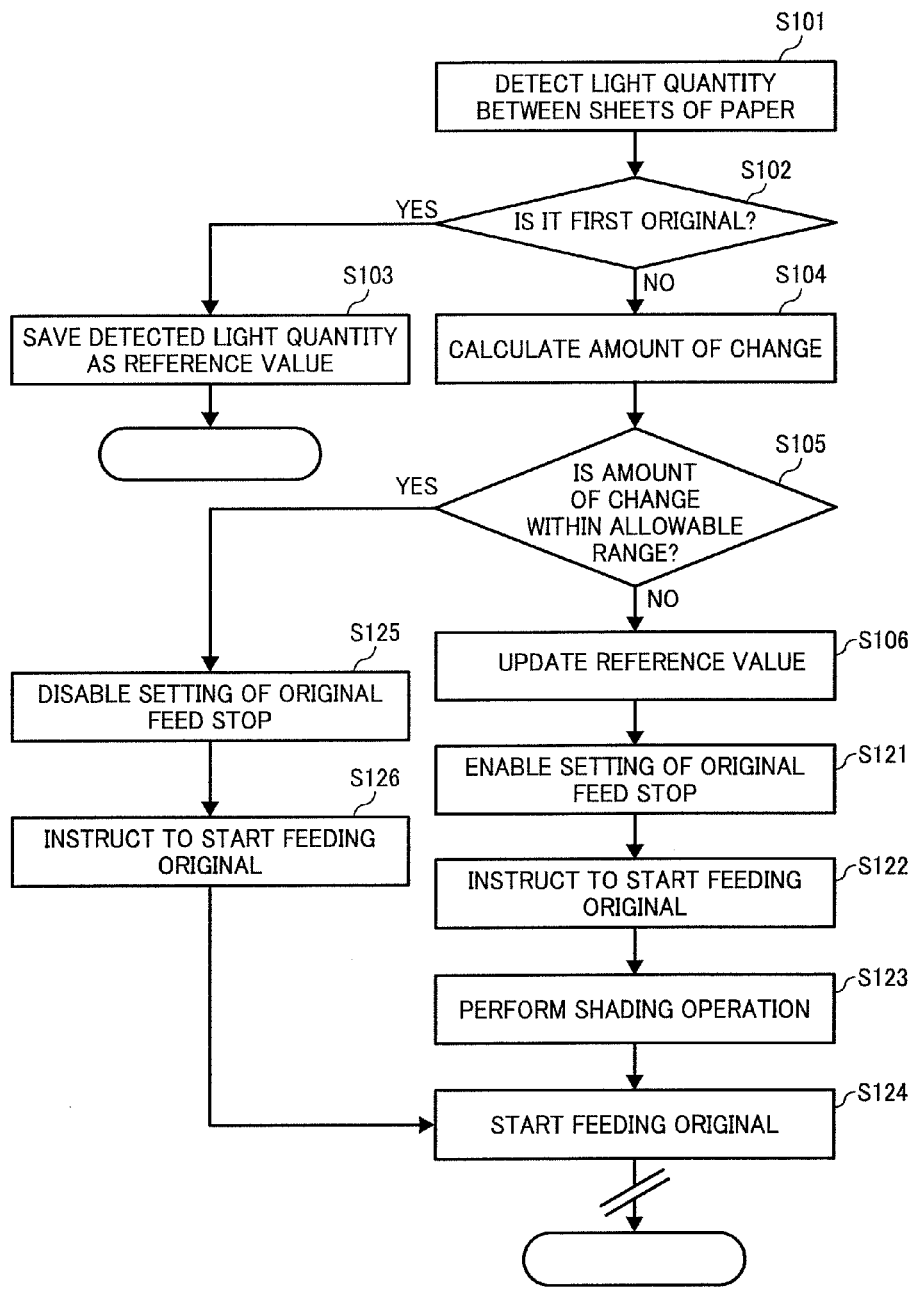
FIG. 5 is a flowchart of another example of a control process executed by the image reading apparatus.

In the flowchart of FIG. 3, the nonstop operation is realized by instructing to start feeding of the next original at Step S111. However, the nonstop operation can be realized with some other method. For example, to switch between the nonstop operation and the stop operation, "nonstop" and "stop" settings can be provided, and, if "nonstop" is set, a trigger of a next start of sheet-through operation is output at the timing before the sheet-through operation is decelerated or before it is stopped. FIG. 5 is a flowchart of an example of previously setting whether the nonstop operation is to be executed.

As shown in FIG. 5, the scanner unit performs a density measuring operation in an interval between sheets of paper (Step S101). The density measuring operation includes measuring a density of a member that is provided on the original feeding side. If the preceding original is the first original, then the measured density is saved as a reference value (Steps S102 and S103). If the preceding original is an original other than the first original (Step S102), an amount of change is calculated based on the reference value and the density measured at Step S101 (Step S104). The amount of change is expressed in percent. An allowable range of the amount of change is previously determined. It is determined whether the calculated amount of change is within the allowable range (Step S105). If the calculated amount of change is within the allowable range (YES at Step S105), the setting of "original feed stop" is disabled (Step S125), and then an instruction to start original feeding operation is output (Step S126). When feeding of the next original is started (Step S124), the process is terminated.

On the other hand, if the calculated amount of change is out of the allowable range (NO at Step S105), it means that the current reference value is no more appropriate for the current conditions. In this situation, the reference value is updated (Step S106).

When updating the reference value, the setting of the original feed stop is enabled (Step S121), an instruction to start original feeding operation is output (Step S122), the shading operation is performed to acquire new white data while the original feed stop is in enabled state, and the existing white data is corrected, or updated, with the new white data (Step S123). Finally, feeding of originals is started at the timing T1 shown in FIG. 8 (Step S124), and the process is terminated. Thereafter, Steps S101 to S124 are repeated for all the originals to be read. The shading data generating/updating unit 2011 calculates new shading data from the white data and updates the existing shading data with the new shading data.

Thus, the stop operation can be implemented when the shading operation is executed, and the stop operation can be switched to the nonstop operation when the shading operation is not executed. This enables improvement of the scanning productivity while maintaining the image quality.

Figure 6:
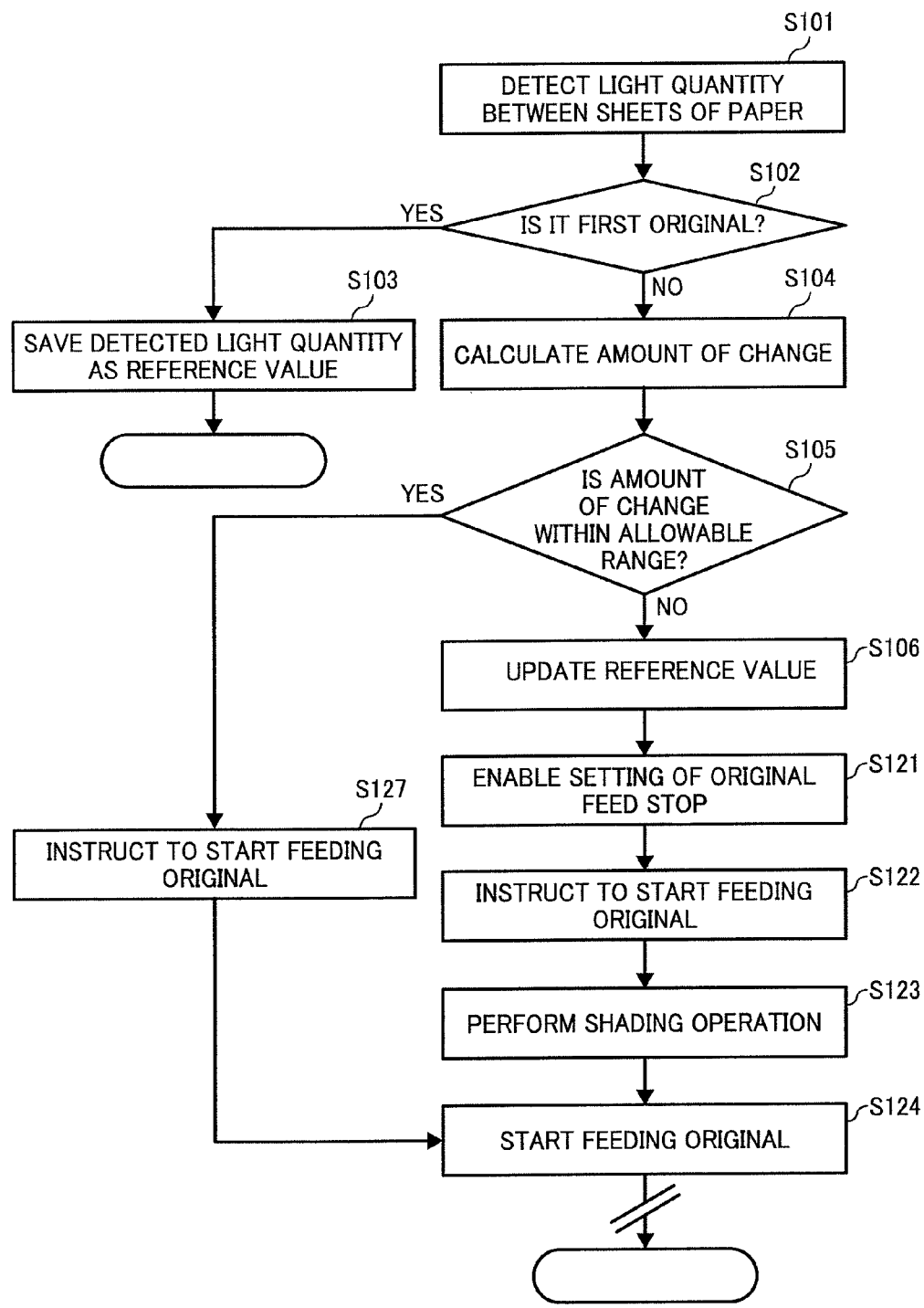
FIG. 6 is a flowchart of still another example of a control process executed by the image reading apparatus.

In the flowchart of FIG. 3, as explained above, the nonstop operation is instructed by instructing the original feeding start at Step S111, however, to switch between the nonstop operation and the stop operation, for the nonstop operation, by triggering a next start of sheet-through operation at the timing before the sheet-through operation is decelerated or before it is stopped, the nonstop operation is performed, and for the stop operation, by triggering a start of sheet-through operation after the sheet-through operation is stopped, the stop operation can also be performed. FIG. 6 is a flowchart of an example of starting the sheet-through operation after an original is stopped when the nonstop operation is not executed.

In this example, the process to be performed when the amount of change is within the allowable range at Step S105 is different from that of the flowchart shown in FIG. 5. Specifically, when the amount of change is within the allowable range at Step S105 (YES at Step S105), an instruction to start original feeding operation is output at Step S127. This enables the process to continue without stopping the original. The rest of the process is the same as that explained with reference to the flowchart in FIG. 5.

By performing the processes in the above manner, the stop operation can be implemented when the shading operation is executed, and the stop operation can be switched to the nonstop operation when the shading operation is not executed. Thus, the scanning productivity can be improved while maintaining the image quality.

In the image reading apparatus that controls switching between stop and nonstop operations of the sheet-through operation according to whether the shading operation is to be executed or not, the original easily skews at the time of the nonstop operation, and, this may result in a decrease in the quality of an image scanned through the nonstop operation. As a countermeasure against this problem, when the image quality is to be given preference over the productivity, it is desirable to enable scanning with the stop operation at any time by inhibiting scanning with the nonstop operation.

Therefore, as shown in FIG. 4, an operation display unit 206 is provided as a user interface through which the user can set whether or not the nonstop operation is to be executed in the CPU 2010 of the image processor (controller) 201, so that it can be switched, according to the result of user selection, whether or not the nonstop operation is executed. Consequently, the user can set either one of the operations by operating a selection key to select the operation through the operation display unit 206. At this time, user settings are stored in a nonvolatile storage, for example, in a recording medium 207 such as a memory controlled by the CPU 2010. With this feature, whether or not the nonstop operation is executed can be switched based on a set content even after the power is on or off. Because the user can set the execution or the non-execution of the nonstop operation in the above manner, degradation of image quality can be prevented. At this time, because information for the execution or the non-execution of the nonstop operation set by the user can be stored, another setting of the information required at the time of the power ON can be eliminated, which allows for improved usability.

The image reading apparatus may also be configured to detect by itself how the original skews, permit scanning with the nonstop operation before the skew occurs, and inhibit scanning with the nonstop operation after the skew occurs. Detection of the skew is not particularly shown in the figures. However, the detection is implemented by comparing the length of a size detected by an original-size detection mechanism with that of an original size obtained by being inversely calculated from output times of detection signals of an original detection sensor that detects an original while being fed (signal being ON when the leading edge of the original is detected, and signal being OFF when the trailing edge thereof passes). It is determined based on the comparison that the skew has occurred if the length is different from the original size by a predetermined length or more. Based on this determination, the operation can be automatically switched to the stop operation upon occurrence of the skew, so that images can be provided to the user without degradation of image quality.

It goes without saying that the present invention is not limited to the embodiment, but covers all the technical items in the technical idea described in the scope of the claims.

According to an aspect of the present invention, improved scanning productivity can be achieved while maintaining the image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
   a scanner unit configured to scan an original and acquire image data;
   an original tray for stacking a pile of originals;
   a feeding control unit that controls feeding of originals from the original tray to a scanning position, the control of feeding of original including a sheet-through operation in which originals are fed continuously one by one from the original tray to a scanning position;
   a scanning control unit that causes the scanner unit to be fixed at the scanning position so as to scan originals that pass over the scanning position when the originals are fed from the original tray;
   a white plate provided in a position different from the scanning position;
   a shading operation unit that performs a shading operation, the shading operation including moving the scanner unit to the position of the white plate, and scanning the white plate to acquire white data to be used in performing shading correction on image data acquired by the scanner unit; and
   a measuring unit that performs a light-quantity measuring operation, the light-quantity measuring operation including causing the scanner unit to measure a light quantity of an exposure lamp that illuminates the original at the scanning position, wherein
   when a pile of originals is placed on the original tray, the feeding control unit performs the sheet-through operation,
   when one original is fed from the original tray to the scanning position, the shading operation unit performs the shading operation to acquire current white data, the measuring unit performs the light-quantity measuring operation to acquire a current light quantity of the exposure lamp as a reference value,
   when a subsequent original is fed from the original tray to the scanning position, the measuring unit performs the light-quantity measuring operation to acquire a current light quantity of the exposure lamp as a subsequent light quantity, and
   when an amount of change between the reference value and the subsequent light quantity is out of a predetermined range, the shading operation unit performs the shading operation to acquire new white data and updates existing white data with the new white data, the measuring unit performs the light-quantity measuring operation to acquire a new light quantity and updates an existing light quantity with the new light quantity, and
   the feeding control unit does not stop the sheet-through operation when the shading operation unit is not to perform the shading operation, and the feeding control unit stops the sheet-through operation when the shading operation unit is to perform the shading operation.

2. The image reading apparatus according to claim 1, wherein
   when the shading operation unit is not to perform the shading operation, the feeding control unit sets so as to disable stopping of the sheet-through operation at the time of starting of the sheet-through operation, and
   when the shading operation unit is to perform the shading operation, the feeding control unit sets so as to enable stopping of the sheet-through operation at the time of starting of the sheet-through operation.

3. The image reading apparatus according to claim 2, further comprising a switching unit that switches whether or not the sheet-through operation is executed.

4. The image reading apparatus according to claim 2, further comprising a unit that inhibits a nonstop feeding operation in the sheet-through operation.

5. The image reading apparatus according to claim 1, wherein
   when the shading operation unit is not to perform the shading operation, the feeding control unit triggers starting of the sheet-through operation before the sheet-through operation is decelerated, and
   when the shading operation unit is to perform the shading operation, the feeding control unit triggers starting of the sheet-through operation after the sheet-through operation is stopped.

6. The image reading apparatus according to claim 5, further comprising a switching unit that switches whether or not the sheet-through operation is executed.

7. The image reading apparatus according to claim 5, further comprising a unit that inhibits a nonstop feeding operation in the sheet-through operation.

8. An image forming apparatus comprising an image reading apparatus according to claim 1.

9. An image reading method enforced on an image reading apparatus, the image reading apparatus including a scanner unit configured to scan an original and acquire image data;
   an original tray for stacking a pile of originals;
   a feeding control unit that controls feeding of originals from the original tray to a scanning position, the control of feeding of original including a sheet-through operation in which originals are fed continuously one by one from the original tray to a scanning position;

a scanning control unit that causes the scanner unit to be fixed at the scanning position so as to scan originals that pass over the scanning position when the originals are fed from the original tray;

a white plate provided in a position different from the scanning position;

a shading operation unit that performs a shading operation, the shading operation including moving the scanner unit to the position of the white plate, and scanning the white plate to acquire white data to be used in performing shading correction on image data acquired by the scanner unit; and a measuring unit that performs a light-quantity measuring operation, the light-quantity measuring operation including causing the scanner unit to measure a light quantity of an exposure lamp that illuminates the original at the scanning position, the image reading method comprising:

when a pile of originals is placed on the original tray, the feeding control unit performing the sheet-through operation, when one original is fed from the original tray to the scanning position, the shading operation unit performing the shading operation to acquire current white data, the measuring unit performing the light-quantity measuring operation to acquire a current light quantity of the exposure lamp as a reference value, when a subsequent original is fed from the original tray to the scanning position, the measuring unit performing the light-quantity measuring operation to acquire a current light quantity of the exposure lamp as a subsequent light quantity, and when an amount of change between the reference value and the subsequent light quantity is out of a predetermined range, the shading operation unit performing the shading operation to acquire new white data and updates existing white data with the new white data, the measuring unit performing the light-quantity measuring operation to acquire a new light quantity and updates an existing light quantity with the new light quantity, and the feeding control unit not stopping the sheet-through operation when the shading operation unit is not to perform the shading operation, and the feeding control unit stopping the sheet-through operation when the shading operation unit is to perform the shading operation.

10. The image reading method according to claim 9, wherein when the shading operation unit is not to perform the shading operation, the feeding control unit setting so as to disable stopping of the sheet-through operation at the time of starting of the sheet-through operation, and when the shading operation unit is to perform the shading operation, the feeding control unit setting so as to enable stopping of the sheet-through operation at the time of starting of the sheet-through operation.

11. The image reading method according to claim 10, further comprising setting switching information that indicates whether or not the sheet-through operation is executed.

12. The image reading method according to claim 10, further comprising inhibiting a nonstop feeding operation in the sheet-through operation.

13. The image reading method according to claim 9, wherein when the shading operation unit is not to perform the shading operation, the feeding control unit triggering starting of the sheet-through operation before the sheet-through operation is decelerated, and when the shading operation unit is to perform the shading operation, the feeding control unit triggering starting of the sheet-through operation after the sheet-through operation is stopped.

14. The image reading method according to claim 13, further comprising setting switching information that indicates whether or not the sheet-through operation is executed.

15. The image reading method according to claim 13, further comprising inhibiting a nonstop feeding operation in the sheet-through operation.

16. An image forming method comprising the image reading method according to claim 9.

* * * * *